US011810568B2

(12) United States Patent
Aleksic et al.

(10) Patent No.: US 11,810,568 B2
(45) Date of Patent: Nov. 7, 2023

(54) SPEECH RECOGNITION WITH SELECTIVE USE OF DYNAMIC LANGUAGE MODELS

(71) Applicant: Google LLC, Mountain View, CA (US)

(72) Inventors: Petar Aleksic, Jersey City, NJ (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 193 days.

(21) Appl. No.: 17/118,232

(22) Filed: Dec. 10, 2020

(65) Prior Publication Data

US 2021/0090569 A1   Mar. 25, 2021

Related U.S. Application Data

(63) Continuation of application No. 14/982,567, filed on Dec. 29, 2015, now Pat. No. 10,896,681.

(51) Int. Cl.
*G10L 15/26* (2006.01)
*G10L 15/18* (2013.01)
(Continued)

(52) U.S. Cl.
CPC ............. *G10L 15/26* (2013.01); *G10L 15/07* (2013.01); *G10L 15/183* (2013.01);
(Continued)

(58) Field of Classification Search
CPC ..... G10L 15/26; G10L 15/07; G10L 15/1815; G10L 15/183; G10L 15/197; G10L 15/30;
(Continued)

(56) References Cited

U.S. PATENT DOCUMENTS 6,081,779 A    6/2000 Besling et al.
6,138,099 A    10/2000 Lewis et al.
(Continued)

OTHER PUBLICATIONS

International Preliminary Report on Patentability issued in International Application No. PCT/US2016/056425, dated Jul. 12, 2018, 9 pages.

(Continued)

*Primary Examiner* — Bhavesh M Mehta
*Assistant Examiner* — Darioush Agahi
(74) *Attorney, Agent, or Firm* — Honigman LLP; Brett A. Krueger; Grant Griffith

(57) ABSTRACT

A computer-implemented method for transcribing an utterance includes receiving, at a computing system, speech data that characterizes an utterance of a user. A first set of candidate transcriptions of the utterance can be generated using a static class-based language model that includes a plurality of classes that are each populated with class-based terms selected independently of the utterance or the user. The computing system can then determine whether the first set of candidate transcriptions includes class-based terms. Based on whether the first set of candidate transcriptions includes class-based terms, the computing system can determine whether to generate a dynamic class-based language model that includes at least one class that is populated with class-based terms selected based on a context associated with at least one of the utterance and the user.

20 Claims, 7 Drawing Sheets

(51) Int. Cl.
  *G10L 15/183* (2013.01)
  *G10L 15/07* (2013.01)
  *G10L 15/197* (2013.01)
  *G10L 15/30* (2013.01)
  *G10L 15/22* (2006.01)
  *G10L 15/06* (2013.01)
  *G10L 15/08* (2006.01)

(52) U.S. Cl.
  CPC ........ *G10L 15/1815* (2013.01); *G10L 15/197* (2013.01); *G10L 15/30* (2013.01); *G10L 2015/0635* (2013.01); *G10L 2015/088* (2013.01); *G10L 2015/228* (2013.01)

(58) Field of Classification Search
  CPC ....... G10L 2015/0635; G10L 2015/088; G10L 2015/228
  See application file for complete search history.

(56) References Cited

U.S. PATENT DOCUMENTS

| | | | |
|---|---|---|---|
| 6,157,912 | A | 12/2000 | Kneser et al. |
| 6,901,364 | B2 | 5/2005 | Nguyen et al. |
| 7,275,033 | B1 | 9/2007 | Zhao et al. |
| 8,447,608 | B1 | 5/2013 | Chang et al. |
| 8,489,398 | B1* | 7/2013 | Gruenstein ............. G10L 15/08 704/254 |
| 8,645,138 | B1 | 2/2014 | Weinstein et al. |
| 8,775,177 | B1 | 7/2014 | Heigold et al. |
| 8,812,299 | B1* | 8/2014 | Su ......................... G06F 40/216 704/10 |
| 9,031,839 | B2 | 5/2015 | Thorsen et al. |
| 9,165,028 | B1 | 10/2015 | Christensen et al. |
| 9,324,323 | B1 | 4/2016 | Bikel et al. |
| 2002/0087309 | A1 | 7/2002 | Lee et al. |
| 2002/0087315 | A1 | 7/2002 | Lee et al. |
| 2003/0050778 | A1 | 3/2003 | Nguyen et al. |
| 2004/0088162 | A1 | 5/2004 | He et al. |
| 2005/0055210 | A1* | 3/2005 | Venkataraman ...... G10L 15/183 704/E15.009 |
| 2005/0080632 | A1 | 4/2005 | Endo et al. |
| 2005/0182628 | A1 | 8/2005 | Choi |
| 2006/0074670 | A1 | 4/2006 | Weng et al. |
| 2006/0100876 | A1 | 5/2006 | Nishizaki et al. |
| 2007/0100618 | A1 | 5/2007 | Lee et al. |
| 2009/0030698 | A1 | 1/2009 | Cerra et al. |
| 2009/0313017 | A1 | 12/2009 | Nakazawa et al. |
| 2010/0185448 | A1 | 7/2010 | Meisel |
| 2010/0195806 | A1 | 8/2010 | Zhang et al. |
| 2011/0029301 | A1 | 2/2011 | Han et al. |
| 2011/0055256 | A1* | 3/2011 | Phillips ................... G10L 15/30 707/769 |
| 2011/0144999 | A1 | 6/2011 | Jang et al. |
| 2011/0153324 | A1 | 6/2011 | Ballinger et al. |
| 2011/0208507 | A1 | 8/2011 | Hughes |
| 2013/0018650 | A1 | 1/2013 | Moore et al. |
| 2013/0317822 | A1 | 11/2013 | Koshinaka |
| 2015/0025884 | A1 | 1/2015 | White et al. |
| 2015/0058018 | A1* | 2/2015 | Georges .................. G10L 15/08 704/257 |
| 2015/0134326 | A1 | 5/2015 | Bell et al. |
| 2015/0279360 | A1 | 10/2015 | Mengibar et al. |
| 2015/0340024 | A1 | 11/2015 | Schogol et al. |
| 2016/0063994 | A1 | 3/2016 | Skobeltsyn et al. |
| 2016/0104482 | A1 | 4/2016 | Aleksic et al. |
| 2016/0224658 | A1 | 8/2016 | Liu et al. |
| 2017/0178666 | A1* | 6/2017 | Yu .......................... G10L 15/197 |
| 2017/0365251 | A1* | 12/2017 | Park ...................... G10L 15/063 |

OTHER PUBLICATIONS

International Search Report and Written Opinion in International Application No. PCT/US2016/056425, dated Jan. 23, 2017, 13 pages.

Thadani, Kapil, Fadi Biadsy, and Daniel M. Bikel, "On-the-fly Topic Adaptation for YouTube Video Transcription." Interspeech, Sep. 2012, pp. 1-4.

Mohri, "Speech Recognition-Lecture 12: Lattice Algorithms," Nov. 25, 2012, Courant Institute of Mathematical Sciences, New York University, New York City, NY, 35 pages.

Odell, "The Use of Context in Large Vocabulary Speech Recognition," Mar. 1995, Ph.D. Thesis, Queen's College, University of Cambridge, Cambridge, UK, 146 pages.

Povey et al., "Generating Exact Lattices in the WFST Framework," Proceedings of the IEEE International Conference on Acoustics, Speech, and Signal Processing (ICASSP) 2012, Mar. 25-30, 2012, pp. 4213-4216, IEEE, Kyoto, Japan.

* cited by examiner

US 11,810,568 B2

SPEECH RECOGNITION WITH SELECTIVE USE OF DYNAMIC LANGUAGE MODELS

This patent application is a continuation of, and claims priority under 35 U.S.C. § 120 from, U.S. patent application Ser. No. 14/982,567, filed on Dec. 29, 2015. The disclosure of this prior application is considered part of the disclosure of this application and is hereby incorporated by reference in its entirety.

TECHNICAL FIELD

This document generally relates to speech recognition and the use of class-based language models to transcribe speech to text.

BACKGROUND

Speech recognition has become a widely adopted and frequently used mode of interacting with computing devices. Speech input may be more convenient and efficient than traditional input modes such as typing through a keyboard. For example, mobile computing devices may offer speech recognition services as an alternative input mode to typing characters through a virtual keyboard on a touchscreen. Some computing devices are configured to accept voice commands from a user as a shortcut to performing certain actions on the computing device. Voice commands and other speech can be transcribed to text using language models that predict the likelihood that one or more sequences of terms occur in the speech. Some language models group related terms into classes and can predict the likelihood that a class of terms occurs in a speech sample.

SUMMARY

This document describes methods, devices, systems, and other techniques for efficiently employing class-based language models to transcribe an utterance from speech to text. In general, a speech recognition system can perform a preliminary decoding of an utterance using a static class-based language model to determine whether the utterance would likely benefit from custom models that account for a context associated with the utterance or a user who spoke the utterance. If the preliminary decoding indicates that such custom models likely would facilitate accurate transcription of the utterance, the system may dynamically generate one or more models that include class-based terms determined to be relevant to the user or the utterance. In some implementations, performing a preliminary decoding of an utterance using a static model, rather than first using dynamically generated context-dependent models, can reduce the latency in returning a transcription result, and can reduce the computational expense involved in the transcription process.

Some implementations of the subject matter described herein include a computer-implemented method. The method can include receiving, at a computing system, speech data that characterizes an utterance of a user. The computing system may access a static class-based language model that includes a plurality of classes that are each populated with class-based terms selected independently of the utterance or the user. A first lattice may be generated, by the static class-based language model, that characterizes likelihoods that different permutations of terms accurately transcribes at least a portion of the utterance. The computing system can analyze the first lattice to determine whether the utterance likely includes class-based terms. In response to determining that the utterance likely includes class-based terms, the first lattice can be modified to create a second lattice by adding to the first lattice class-based terms that are determined to relate to a context associated with at least one of the utterance and the user, such that the second lattice characterizes likelihoods that different permutations of terms, including the added class-based terms, accurately transcribes the at least the portion of the utterance. The second lattice can be used to generate a transcription of the utterance, and the utterance can be outputted by the computing system.

Some implementations of the subject matter described herein include a computer-implemented method. The method can include receiving, at a computing system, speech data that characterizes an utterance of a user. A first set of candidate transcriptions of the utterance can be generated using a static class-based language model that includes a plurality of classes that are each populated with class-based terms selected independently of the utterance or the user. The computing system can then determine whether the first set of candidate transcriptions includes class-based terms. Based on whether the first set of candidate transcriptions is determined to include class-based terms, the computing system can determine whether to generate a dynamic class-based language model that includes at least one class that is populated with class-based terms selected based on a context associated with at least one of the utterance and the user. A speech recognition result can then be provided for the utterance.

These and other implementations may optionally include one or more of the following features.

The first set of candidate transcriptions can be determined to include class-based terms, and in response, the dynamic class-based language model can be generated.

A second set of candidate transcriptions of the utterance can be generated using the dynamic class-based language model. Providing the speech recognition result for the utterance can include determining the speech recognition result based on one or more of the candidate transcriptions among the second set of candidate transcriptions.

Generating the first set of candidate transcriptions can include generating a lattice that comprises permutations of terms and probabilities that each of the permutations accurately transcribes at least a portion of the utterance. Generating the second set of candidate transcriptions can include adding to the lattice class-based terms selected based on the context associated with the at least one of the utterance and the user.

Generating the dynamic class-based language model can include populating a proper subset of the plurality of classes from the static class-based language model with class-based terms selected based on the context associated with the at least one of the utterance and the user, wherein the proper subset of classes are selected from among the plurality of classes based on identifying that the first set of candidate transcriptions include class-based terms within the proper subset of classes.

Determining whether the first set of candidate transcriptions includes class-based terms can include searching the first set of candidate transcriptions for occurrences of labels that identify the classes of class-based terms in the first set of candidate transcriptions.

The computing system can determine that the first set of candidate transcriptions does not include class-based terms, and the computing system can select to not generate the dynamic class-based language model as a result of determining that the first set of candidate transcriptions does not include class-based terms.

The static class-based language model can be an n-gram language model.

Context data associated with the user or the utterance can be asynchronously retrieved before determining whether to generate the dynamic class-based language model.

The computing system can determine that the dynamic class-based language model is to be generated, and can retrieve context data associated with the user or the utterance that is needed to generate the dynamic class-based language model in response to determining that the dynamic class-based language model is to be generated.

The plurality of classes in the static class-based language model can include at least one of a contact names class, a locations class, a restaurants class, a dates class, and a times class.

The plurality of classes in the static class-based language model can be pre-populated, and the class-based terms in the static class-based language model can be selected independently of the utterance or the user, before the computing system receives the speech data that characterizes the utterance.

Some implementations of the subject matter described herein include one or more non-transitory computer-readable media having instructions stored thereon that, when executed by one or more processors, cause performance of operations. The operations can include: receiving speech data that characterizes an utterance of a user; generating a first set of candidate transcriptions of the utterance using a static class-based language model that includes a plurality of classes that are each populated with class-based terms selected independently of the utterance or the user; determining whether the first set of candidate transcriptions includes class-based terms; determining, based on whether the first set of candidate transcriptions is determined to include class-based terms, whether to generate a dynamic class-based language model that includes at least one class that is populated with class-based terms selected based on a context associated with at least one of the utterance and the user; and providing a speech recognition result for the utterance.

In some implementations, the methods, devices, systems, and other techniques described herein may realize one or more of the following advantages. A speech recognition system that transcribes utterances of a user to text may reduce the latency in returning a transcription to the user by first performing a preliminary decoding of the utterance using a pre-generated static class-based language model before performing more refined decoding of the utterance using dynamic models having classes customized to the utterance or the user. If the preliminary decoding of the utterance indicates that the utterance likely does not include class-based terms, then the system may choose to forego generation of a dynamic class-based language model. This approach may allow the system to more quickly transcribe the utterance in cases where the utterance does not include class-based terms, or where the utterance at least does not include class-based terms that would be benefited by a custom model. In some implementations, the computational expense of transcribing an utterance can be reduced by selectively generating custom class-based language models only for utterances that likely include class-based terms, while not generating the class-based language models for utterances that are determined to not include class-based terms.

The details of one or more implementations are set forth in the accompanying drawings and the description below. Other features, objects, and advantages will be apparent from the description and drawings, and from the claims.

DESCRIPTION OF DRAWINGS

FIG. 2A illustrates a word lattice generated by a static class-based language model, and FIG. 2B illustrates a modified word lattice in which the lattice from FIG. 2A has been augmented with additional class-based terms determined to be associated with a context of the utterance or the user.

Like reference symbols in the various drawings indicate like elements.

DETAILED DESCRIPTION

Figure 1:
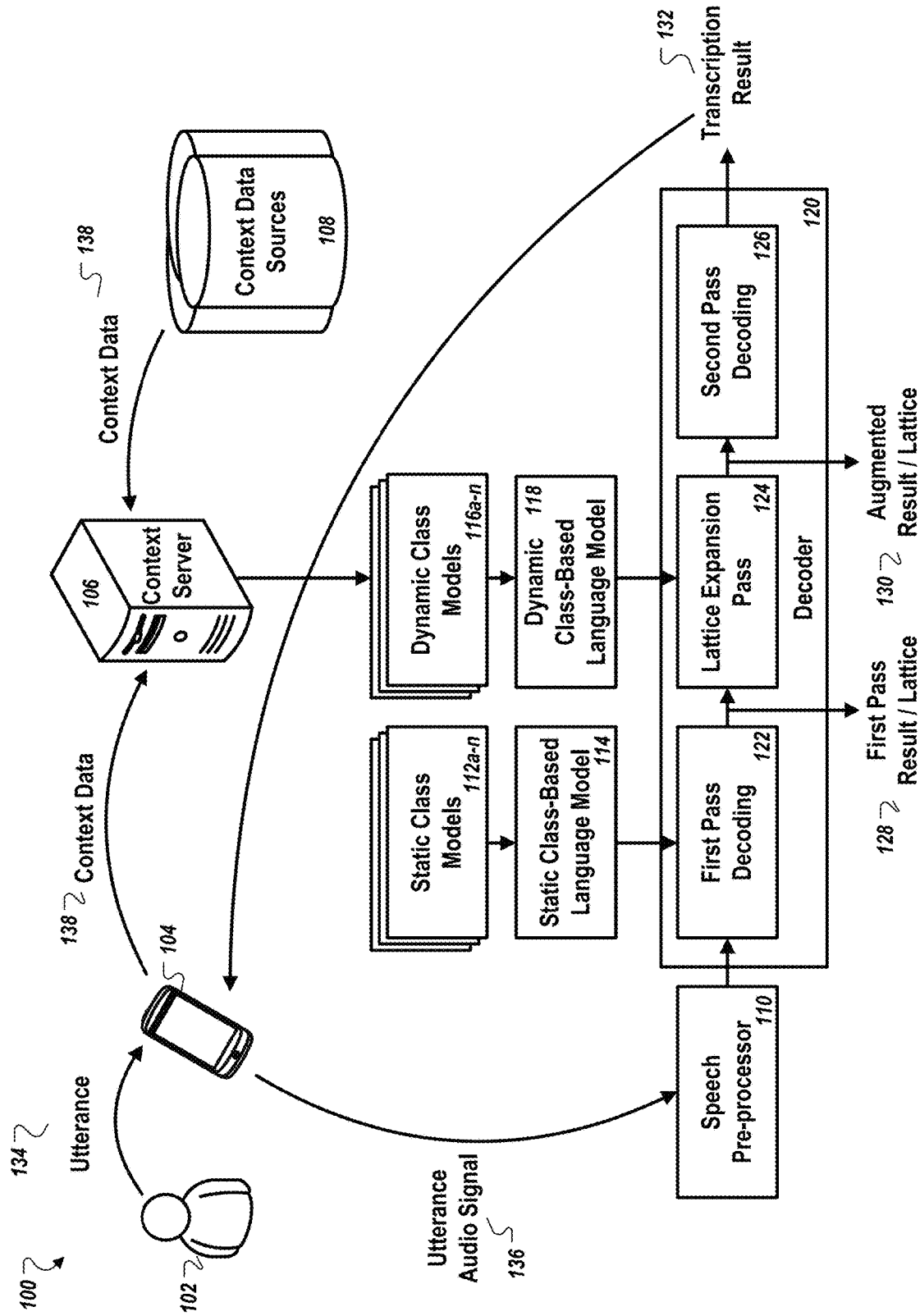
FIG. 1 is a conceptual diagram of an example computing system that has selective custom class generation capabilities for transcribing an utterance. In some implementations, the system depicted in FIG. 1 may be used to perform the methods described herein.

This document generally describes methods, devices, systems, and other techniques for efficiently employing class-based language models to transcribe an utterance from speech to text. In some implementations as described herein, a speech recognition system performs a first-pass decoding of a speech signal using a static class-based language model that has been created independently of the speech signal that is to be transcribed, or of a user whose utterance resulted in the speech signal. The speech system may then analyze an output of the static class-based language model to determine whether the utterance processed by the static model includes class-based terms, and if so, which classes are implicated by the utterance. Based on a result of the analysis, the system may then determine whether dynamically generated, user-specific or utterance-specific models would be beneficial to accurately transcribe the utterance. By delaying generation of the user-specific or utterance-specific models until confirming that a given utterance includes class-based terms, the system may avoid generating such models when they are not needed, and/or may reduce the latency involved in transcribing an utterance that may otherwise result from immediately generating dynamic, user-specific or utterance-specific models upon receipt of a speech signal.

For context, language models are generally capable of determining likelihoods (e.g., probabilities) that a given sequence of terms would occur in a language. N-gram models, for example, may indicate the probability of a particular term following a sequence of n−1 terms that precede the particular term. Thus, a 4-gram model may indicate the relative statistical likelihoods that the fourth term in the phrase, "The car is <garbled>", is either "red," "blue," "broken," "big," or another term.

In some implementations, the probabilities that a language model assigns to sequences of terms reflect statistical occurrences of the sequences in a set of data that was used to train the language model. For example, the language model may be developed by examining a vast amount of language from sources such as webpages and other electronic documents, query logs, books, social media, etc. The relative frequencies of sequences of terms in the source data may be determined and used as the basis for a language model. One consideration that arises in creating language models, however, is that it is often difficult to train the model over a sufficiently large body of data to reliably estimate the likelihood of all permutations of the many terms that occur in a language. To this end, class-based language models can be employed, which leverage statistics among related terms in a language, thereby allowing the language model to predict the likelihood of sequences of terms, even for terms that do not often occur in the training data.

Class-based language models are generally language models programmed to determine likelihoods (e.g., probabilities) that a given sequence of terms and class-symbols would occur in a language. In some implementations, the class-based language model may be trained by replacing original terms in the training data, which belong to pre-defined classes of terms (e.g., topically related categories of terms), with corresponding class-based symbols. For example, consider the training sentence "Larry's favorite pastime is watching Seinfeld re-runs and eating pizza." This sentence may be processed to replace its class-based terms with corresponding class-symbols as follows: "$name favorite pastime is watching $tv_show re-runs and eating $food." The class-based terms that were removed from the sentence may then be added to a respective class model (e.g., "Larry" may be added to a $names class model, "Seinfeld" may be added to a $tv_show class model, and "pizza" may be added to a $food class model). The class models may each include a collection of terms belonging to the respective class for the model, and may also store data indicating the relative probabilities that each term in the class occurs in a language or in a given utterance. The $tv_show class model, for example, may include a list of TV shows, and may include respective probabilities that each show occurs in a given language sample. At runtime, the class-based language model in a speech recognizer may then identify the classes for class-based terms in an utterance or other language sequence based on terms adjacent to or near the class-based term, and/or based on context data external to the language sequence. Once the classes are identified, the language model may access the corresponding lists of terms for the identified classes, and one or more class-based terms selected from the lists for a transcription of an utterance. For example, a class-based language model in a speech system that is decoding the utterance for "Larry's favorite pastime is watching Seinfeld re-runs and eating pizza," may determine that the utterance includes class-based terms from both the $tv_show class and the $food class based on the preceding terms "watching" and "eating," respectively. The language model's $tv_show class may include a multitude of different television show titles, from which the term "Seinfeld" is selected (e.g., based on an acoustical analysis of the utterance, and/or based on external context such as profile data for the speaker that indicates Seinfeld is a favorite show of the speaker). Similarly, the term pizza may be selected from the $food class.

In some cases, a speech system may dynamically generate class-based language models that are customized to a specific speaker, the context of a specific utterance, or both. These customized language models may facilitate accurate decoding of utterances that include class-based terms, including class-based terms that are overrepresented in the lexicon of a particular speaker as compared to the language generally. For example, a general class-based language model that has been trained on a broad-base of training samples in a language may be much more likely to incorrectly transcribe the utterance "I invited Jacki to the house for dinner" as "I invited Jackie to the house for dinner" (misspelled name) because, although phonetically identical, the name "Jackie" is more common as an English name than is the name "Jacki." However, some speakers are much more likely to refer to "Jacki" without an -e than would the general population, such as speakers who are friends, family, or colleagues with a "Jacki," or who otherwise communicate frequently with a "Jacki." Therefore, before determining a transcription for the utterance, the speech system may dynamically generate a speaker- (user-) specific class-based language model that skews the likelihood of an utterance from the speaker including the name "Jacki" higher than the likelihood for "Jackie."

In some implementations, the class-based language model may be generated by augmenting lists of class-based terms in a general class-based language model with class-based terms that are determined to be relevant to a context of an utterance that is to be decoded, such as information about the speaker of the utterance. The classes in a class-based language model may include only class-based terms that are determined to relevant to a context of the utterance (e.g., user-specific or utterance-specific terms), or they may include a mix of generally determined and user-specific or utterance-specific terms. In some implementations, terms that were not included in the classes of a static or general language model may be added to the classes of a custom, dynamically generated language model. In some implementations, the probabilities associated with terms in a general language model may be adjusted in the custom, dynamically generated language model. For example, upon receiving a request to transcribe an utterance spoken by Bill, a speech recognition system may obtain (e.g., from a local or remote context server) context data associated with Bill and/or the specific utterance that is to be transcribed. The context data may include, for example, an indication of the location that the utterance was spoken, a list of names in Bill's contact list, a list of names of users to whom Bill is connected on social media, or a combination of these and more. The context data may show that one of Bill's closest contacts is Jacki. Accordingly, the speech system may dynamically generate a customized $names class model for transcribing Bill's utterance, which may be incorporated into a dynamic, user-specific class-based language model. The customized language model may add all or some of Bill's contacts to the $names class, and/or may re-calculate the probability distribution among the terms in the $names class. For example, the term "Jacki" may be assigned a higher probability, whereas the term "Jackie" may be removed from the class or assigned a lower probability.

In some implementations, a speech system may automatically and dynamically generate a customized class-based language model for every request that it receives to transcribe an utterance. For example, if the speech system were implemented as a cloud-based service for transcribing utterances from a wide range of users, the speech system may dynamically generate a custom class-based language model for the specific user who submitted a request to transcribe an utterance (under the assumption that the user is the speaker, for example). Before the speech system has transcribed the utterance, however, the speech system may be unaware of which classes, if any, are implicated in the utterance for any given request. Accordingly, the speech system may generate, on the fly, dynamic class models for all the classes for which context data is available. For example, upon receiving a request to transcribe an utterance from the user Bill, the speech system may dynamically generate a class-based language model that includes a range of customized classes. After the custom classes and language model are built, the speech system may then use the custom language model to decode the utterance, and to determine a transcription for the utterance.

Although the preceding approach is effective in allowing a speech system to generate accurate transcriptions by taking into account the context of a given transcription request, the approach can also introduce latency in responding to a request due to the time involved in dynamically generating customized class models for the request, and incorporating the customized class models into a class-based language model. The approach can also consume significant computing resources of the speech system in order to generate the customized models. Therefore, additional approaches are described with respect to FIGS. 1-5B that, in some implementations, may reduce the latency in transcribing some utterances, and that may reduce the computational expense of transcribing some utterances. These advantages may be realized in some implementations of the techniques described herein by first decoding an utterance using a static (non-customized) class-based language model to determine whether a given utterance likely includes class-based terms. If the initial analysis of the utterance, based on a result of the static class-based language model, indicates that the utterance likely does include class-based terms, then the speech system may generate a class-based language model having classes populated with class-based term based on user-specific or utterance-specific context. Accordingly, the need to dynamically generate custom models for utterances that do not include class-based terms may be eliminated in some implementations. And for utterances that do include class-based terms, dynamic classes may be generated for a subset of all the available classes, namely only those classes that are identified from the first-pass decoding of the utterance with the static model.

Turning to FIG. 1, a conceptual diagram is depicted of an example computing system 100 having selective custom class generation capabilities for transcribing an utterance. The system 100 is capable of receiving speech data for an utterance 134 spoken by a user 102, and performing automatic speech recognition on the utterance 134 to produce a transcription result 132 (i.e., a conversion of the utterance 134 from audio/speech data to text). The system 100 includes a decoder 120 that is configured to perform a first-pass decoding of processed speech data using a static class-based language model 114, without first generating individual customized class models or a customized class-based language model.

In some implementations, the system 100 first detects an utterance 134 at a computing device 104. The computing device 104 may generally be any type of computer that is capable of detecting and recording audio data, and facilitating processing of the audio data locally on the computing device 104, at a remote computing system, or both. For example, the computing device 104 may be a smartphone, a tablet computing device, a notebook computer, a personal desktop computer, a smartwatch or other type of wearable computing device, or another type of computer. In some implementations, the computing device 104 may include a speech recognition service that runs within an operating system or application on the device 104. The speech recognition service may convert speech to text, or may perform certain actions with the device 104 in response to voice commands. The computing device 104 may include a microphone that detects an audio signal when the user 102 speaks the utterance 134, and an analog-to-digital (A/D) converter that digitizes the audio signal. The computing device 104 may also include a networking interface for communicating with other computers over wired and wireless networks, an electronic display, and other user input mechanisms, some of which are described with respect to FIG. 6 below.

Upon detecting the utterance 134, the computing device 104 provides a digitized audio signal 136 of the utterance 134 to a speech pre-processor 110. The speech pre-processor 110 generally serves as a first stage of a speech recognizer that is configured to transcribe the utterance 134 to text. The speech pre-processor 110 can generate processed speech data that is capable of recognition by the decoder 120 and its associated language models 114, 118. In some implementations, the pre-processor 110 includes an acoustic model that determines phonemes or other linguistic units that comprise the utterance 134 from the digitized audio signal 136. The acoustic model may determine the most likely set of candidate phonemes or linguistic units that are spoken in short time intervals of the utterance 134. This data can then be used by the decoder 120 to transcribe the utterance. The decoder 120 can include or operate in conjunction with language models, which generally operate at a higher semantic level than the acoustic model. For example, whereas the acoustic model may map very short segments of the audio signal to short linguistic units (e.g., phonemes) with little, if any, concern for how the linguistic units piece together to form a coherent transcription, the language models may make sense of the collection of linguistic units to determine a transcription result that reflects actual sequences of terms that are likely to occur in a language.

The speech recognizer of the computing system 110 may be implemented locally on the computer device 104, or remotely from the computing device 104. In some implementations, different components of the recognizer may be implemented locally, while other are implemented remotely. In implementations where the speech recognizer is implemented remotely, the computing device 104 may transmit the digitized audio signal 136 to a speech server that implements the speech recognizer on one or more computers separate and apart from the computing device 104. For example, the computing device 104 may send the audio signal 136 (e.g., in a compressed and encrypted format) to the speech server over the Internet. The speech server may then handle the received audio signal 136 by providing it to the speech pre-processor 110, and then to the decoder 120.

In some implementations, the decoder 120 is configured to perform multi-pass decoding of speech data in order to generate a transcription result 132. As shown in FIG. 1, the decoder 120 may include three decoding stages: a first pass decoding 122, a lattice expansion pass 124, and a second pass decoding 126. In some implementations, however, the decoder 120 may perform only a subset of these three passes 122, 124, 126, or may perform additional passes before ultimately generating the transcription result 132. Moreover, as is explained further herein, the content of different utterances 134 may cause the decoder 120 to apply more or fewer passes in generating the transcription result 132. For example, the lattice expansion pass 124 may only be performed, in some implementations, if a result of the first pass decoding 122 indicates that the utterance 134 includes class-based terms for which user-specific context or utterance-specific context is available to refine the transcription.

Figure 2A:
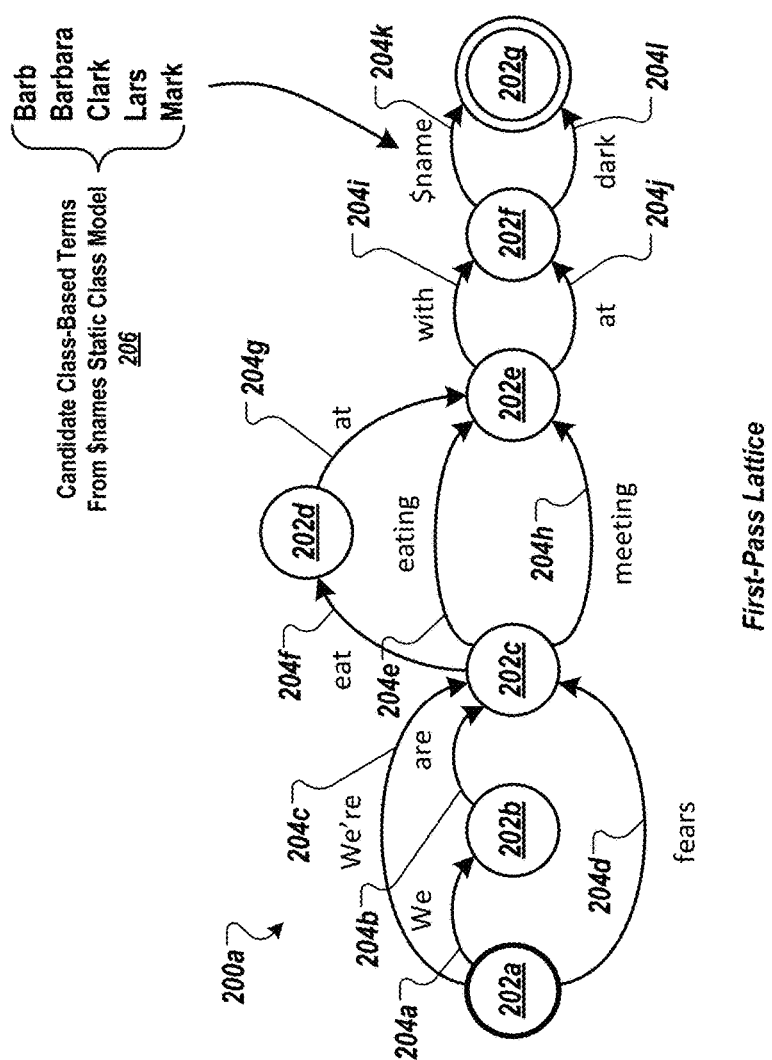
FIGS. 2A and 2B depict graphical representations of word lattices generated by class-based language models for transcribing an utterance of a user.
Figure 2B:
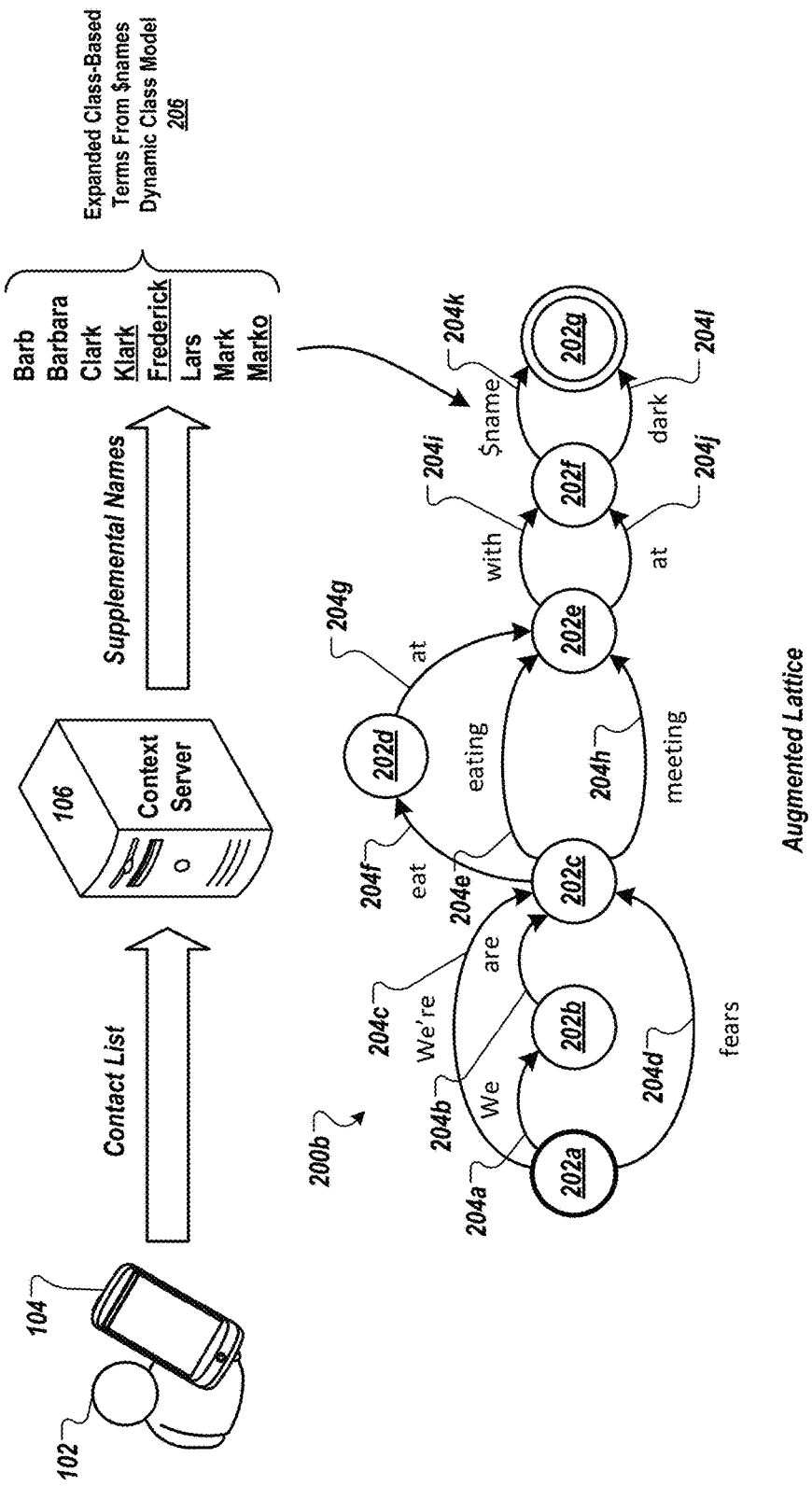

In the first-pass decoding 122, the decoder 120 uses a static class-based language model 114 to determine an initial (e.g., preliminary/non-final) transcription result 128. The decoding results 128, 130 from the language models 114 or 118 after a given pass 122, 124, or 126 may be provided in various forms, but regardless of the form, the results generally identify one or more possible transcriptions of the utterance 134. In some implementations, the results may be provided as individual language sequences (e.g., sentences) for each candidate transcription. For example, a first candidate transcription for the utterance "Larry's favorite pastime is watching Seinfeld re-runs and eating pizza" may be "Harry's favorite time to watch Seinfeld is while eating pizza," and a second candidate transcription is the sentence "Larry's favorite pastime is watching Seinfeld re-runs and eating pizza" (an accurate transcription). In some implementations, the results 128, 130 may be provided in the form of a lattice (e.g., a data structure that represents a lattice). Graphical depictions of example lattices are shown in FIGS. 2A and 2B. A lattice may generally store sequences of terms that form candidate transcriptions, and may include paths that each traverse a different sequence of terms corresponding to a respective transcription.

The static class-based language model 114 generally is not a customized model that has been generated dynamically based on data associated with the user 102 or the utterance 134. Rather, static model 114 may be a general language model that is configured for broad-based use in transcribing utterances from a wide range of users, for example. In some implementations, the static class-based language model 114 may include classes that are populated with terms from static class models 112a-n. The static class models 112a-n may each identify a collection of terms that belong to a corresponding class for the respective class model, and may indicate the relative frequencies of occurrence of the terms in a language (e.g., the relative probabilities of the terms in the language). The static class-based language model 114 may be created by populating the classes in the language model 114 with terms and probability data from the static class models 112a-n. In some implementations, only a portion of all the terms stored in the static class models 112a-n may be brought into the static class-based language model 114 (e.g., the most popular 50-100 terms in each class). The number of class-based terms incorporated into the static class-based language model 114 may be chosen so as to balance the desire for a sufficiently large number of terms to allow for accurate transcription of a range of terms, while not including so many terms so as to unduly compromise the efficiency of the model 114 in producing a recognition result or compromising its size. In some implementations, the static class-based language model 114 may be generated before the utterance 134 is spoken by the user 102 and before the recognizer receives data characterizing the utterance 134.

As the classes in the static class-based language model 114 are not customized to the user 102 or to the utterance 104, the first pass decoding 122 may not, by itself, generate an entirely accurate transcription of the utterance 134 if the utterance 134 includes class-based terms that are not among those found in the model 114, or if the general probabilities associated with the class-based terms in the model 114 are significantly different than the user-specific or utterance-specific probabilities associated with the class-based terms for the user 102 or the utterance 134. Therefore, the decoder 120 may perform additional processing of the speech data if the utterance 134 is determined to include class-based terms. Before discussing the additional processing (e.g., lattice expansion pass 124 and second pass decoding 126) in the following paragraphs, however, it is noted that in some implementations, the decoder 120 may use result 128 of the first pass decoding 122 as the final transcription result 132 if the decoder 120 determines that the utterance 134 likely does not include class-based terms in classes that could be customized with user-specific or utterance-specific terms. The decoder 120 may determine whether the utterance 134 includes class-based terms based on analysis of the first pass decoding result 128. For example, the first pass decoding result 128 may be checked against a pre-defined list of class-based terms to determine the presence of such terms in the result 128. Alternatively, the static class-based language model 114 may annotate the result 128 with labels that identify class-based terms and their corresponding classes. For example, <$name> and </$name> tags may flank names that occur in the result 128 to indicate the names are class-based terms from a contacts name class, or <$food> and </$food> tags may flank food terms similarly (e.g., "<$name>Larry<aname> likes <$food>pizza</$food>."). If the first pass result 128 does not indicate the presence of class-based terms in the utterance 134, then one or more transcription results 132 may be provided as the final output of the decoder 120 based on the first pass result 128. For example, the candidate transcription indicated by the first pass result 128 is determined to be the most probable transcription of the utterance 134 may be provided as the final result 132. In some implementations, even if the first pass result 128 indicates that the utterance 134 does not include class-based terms, the decoder 120 may further process the speech data by performing a second pass decoding 126 (e.g., without performing the lattice expansion pass 124). The second pass decoding 126 may be performed by the static class-based language model 114 or by another language model to generate the final transcription result 132. The second pass decoding 126, however, may benefit from the first pass result 128, which may constrain the analysis in the second pass decoding 126 and allow the final transcription result 132 to be refined for greater transcription accuracy.

If the first pass result 128 indicates that the utterance 134 likely does include class-based terms, however, the decoder 120 may then perform additional operations to incorporate context about the user 102 or the utterance 134 for the purpose of determining final transcription result 132. In some implementations, the decoder 120 can perform a lattice expansion pass 124 that augments the first pass result 128 with additional class-based terms that the system 100 has determined to be related to a context of the user 102 and/or the utterance 134. The lattice expansion pass 124 can be invoked the decoder 120 calling the dynamic class-based language model 118 to generate the augmented result 130. The dynamic class-based language model 118, unlike the static class-based language model 114, includes classes that are wholly or partially populated by terms that relate to a context of the user 102 or the utterance 134. The dynamic class-based language model 118 is thus customized to the user 102 or the utterance 134. For example, the class-based language model 118 may include a list of restaurants in a "restaurants" class that are determined to be near a current location of the user 102 or the user's computing device 104, or may include a list of names of persons to whom the user 102 is connected on social media or listed in the user's 102 contact list. The dynamic class-based language model 118 is generally not created until after the speech recognizer receives the audio signal 136 characterizing the user's utterance 134. At some time after receiving the audio signal 136, the speech recognizer can access context data associated with the user 102 and/or the utterance 134 to dynamically generate the customized class-based language model 118. In some implementations, the dynamic model 118 may be created by importing into a base language model data from the dynamic class models 116a-n, which have been generated based on the accessed context data. For example, when the system 100 determines that the transcription would be aided by user-specific or utterance-specific class-based terms, the speech recognizer can make a call to a context server 106 that stores data relating to a context of users and utterances. The context server 106 may obtain context data 138 from the computing device 104, which may be automatically transmitted from the device 104 along with the utterance audio signal 136 in a transcription request, or the context server 106 may request the context data 138 upon determining a need for such data. In some implementations, context data 138 may be pre-stored at the system 100 or stored at remote computing systems such as context data sources 108. The context server may obtain context data 138 from the remote context data sources 108, for example, by correlating an ID of the user 102 indicated in the transcription request with context data 138 for the same user 102 stored at the remote sources 108. In some implementations, the system 100 may allow the first pass decoding 122 of the utterance 134 to proceed, using the static class-based language model 114, either concurrently with or before retrieval of the context data 138, generation of the dynamic class models 116a-n, and/or generation of the dynamic class-based language model 118. In this way, the system 100 may reduce or eliminate latency resulting from such operations if the utterance 134 does not include class-based terms such that dynamic models are not necessary to determine a final transcription result 132.

In some implementations, during the lattice expansion pass 124, the decoder 120 uses information from the dynamic class-based language model 118 and/or the dynamic class models 116a-n to modify the first pass result 128. The output of the lattice expansion pass 124 is then an augmented result 130. The augmented result 130 may include one or more candidate transcriptions of the utterance 134 that have been refined from the first pass result 128 based on the context data 138 associated with the user 102 or the utterance 134. In some implementations, the lattice expansion pass 134 involves augmenting a lattice from the first pass result 128 with additional class-based terms that relate to the context of the user 102 or the utterance 134. For example, the initial lattice from the first pass result 128 may indicate that an utterance likely includes a term from a "vehicles" class, and that possible transcriptions of the term include "Town & Country," "Taurus," and "Corvette." But the user 102 who spoke the utterance 134 may be a rare car collector, and may have referred in the utterance to a Porsche 356 Carrera GT Speedster. A term for this Porsche model may not occur in the static "vehicles" class model, but may occur in a dynamically generated custom "vehicles" model based on information about the user's 102 penchant for classic, rare cars. Accordingly, the term for the Porsche 356 Carrera GT Speedster may be added to the list of possible "vehicles" in the lattice for the augmented result 130. In some implementations, due to the inclusion of new terms following the lattice expansion pass 124, the system 100 re-scores the augmented lattice 130 based on the acoustics of the audio signal 136. The re-scored lattice generally includes updated probability data for different permutations of terms as likely transcriptions of the utterance 134. The final transcription result 132 may then be determined from the augmented result 130, such as by selecting a candidate transcription in the augmented result 130 that is determined to likely be the most accurate transcription of the utterance 134. In some implementations, the decoder 120 may perform one or more additional decoding passes (e.g., second pass decoding 126) to further refine the candidate transcriptions before a final transcription result 132 is determined.

In some implementations, rather than performing a lattice expansion pass 124 that modifies the first pass result 128, the first pass decoding 122 may instead be followed by a second pass that generates from scratch a new set of candidate transcriptions using the dynamic class-based language model 118. In some implementations, the decoder 120 can identify a subset of classes to generate dynamically based on user or utterance context. The subset can be identified based on information indicated by the first pass result 128. For example, if the first pass result 128 indicates that the utterance 134 includes class-based terms within a "contact names" class, but not within an "athletics teams" class, then the system 100 may restrict creation of dynamic class models to only the "contact names" class and others identified in the first pass result 128, but may not create dynamic class models for the "athletics teams" class and other not identified in the first pass result 128. By limiting the number of class models that are dynamically created for a given transcription request, the system 100 can respond to the request more efficiently, and with less computational expense, than if custom models were created for all available classes regardless of whether the utterance 134 included terms from all classes.

Referring to FIGS. 2A and 2B, graphical depictions of word lattices 200a and 200b are shown for transcribing an utterance of a user. First, FIG. 2A depicts an example word lattice 200a used for transcribing one or more words or other terms from spoken input. The word lattice 200 is represented here as a finite state transducer. The word lattice 200 includes one or more nodes 202a-g that correspond to the possible boundaries between words. The word lattice 200 includes multiple edges 204a-l for the possible words in the candidate transcriptions of the utterance represented by the word lattice 200. In addition, each of the edges 204a-l can have one or more weights or probabilities of that edge being the correct edge from the corresponding node. The weights can be determined by a language model and can be based on, for example, a confidence in the match between the acoustics for a corresponding portion of the utterance audio signal and the word for that edge and how well the word fits grammatically and/or lexically with other words in the word lattice 200. In a word lattice determined by an n-gram language model, for example, the probability of a given word may be based on a statistical likelihood that the word would follow the immediately preceding n−1 words.

For example, initially, the most probable path through the word lattice 200 may include the edges 204c, 204e, 204i, and 204k, corresponding to the text "We're coming with $name." A second best path may include the edges 204d, 204h, 204j, and 204l, corresponding to the text "fears meeting at dark."

Pairs of nodes in the lattices 200a, 200b may be connected by one or more edges that define portions of respective paths corresponding to different words in the various transcription hypotheses. For example, the initial most probable path between the node pair beginning at the node 202a and ending at the node 202c is the edge 204c "We're." This path has alternate paths that include the edges 204a-b "we are" and the edge 204d "fears." Accordingly, the edge 204e "eating" has alternate words that include the edges 204f-g "eat at" and the edge 204h "meeting." The edge 204i "with" has an alternate word that includes the edge 204j "at" and the edge 204k "$name" has an alternate word that includes the edge 204l "dark." In this manner, the word lattice 200 can thus be used in determining one or more candidate transcriptions of an utterance. A score can be assigned to each path through word lattice 200a or 200b that represents a confidence of each candidate transcription.

Notably, the lattices 200a, 200b were each generated by class-based language models. This is shown, for example, by the presence of the class-name identifier "$name" along edge 204k. The "$name" identifier is of course not an actual term in the candidate transcriptions. Rather, the "$name" identifier references a list of candidate class-based terms 206 belonging to the "names" class of the language model. In some implementations, the list 206 may include all the class-based terms belonging to the class identified in the lattice. In some implementations, the list 206 may include only a subset of all the available class-based terms, such as only those terms that, when spoken, acoustically match a corresponding portion of the utterance being transcribed by at least a threshold score. For example, if the actual utterance recited "We're eating with Klark," the language model may reject from the list 206 certain names in the class that are phonetically dissimilar to Klark—such as Abby, Janet, or Nick—but may accept 206 in the list certain names in the class that are phonetically similar, such as Clark and Mark. The edge 204k may have been associated with the "$names" class based on one or more signals associated with the utterance, including that the statistical likelihood of a name following the words "We're eating with" being greater than other terms or classes of terms following that phrase.

In the depiction of FIG. 2A, lattice 200a has been generated by a static class-based language model independent of any context associated with the utterance that is the subject of the transcription, or of the person that made the utterance. For example, lattice 200a may be the result 128 of a first pass decoding 122 by the static class-based language model 114. Thus, the list 206 of candidate class-based terms represented in FIG. 2A are all obtained from a static $names class that includes a collection of names determined from a broad-based analysis of a language (e.g., the most popular names in the language). However, if the actual utterance being transcribed includes a name that is not within the static $names class (e.g., "Klark"), then the static class-based language model may not be capable of accurately transcribing the utterance, given that Klark is not part of the model's lexicon of names. For example, the static language model may instead select the incorrectly spelled "Clark" as the most likely spoken name in the utterance. To ensure the most reliably accurate transcription is obtained, the speech recognizer can choose to perform a lattice expansion pass 124 on the lattice 200a. In some implementations, the choice to expand the lattice 200a can be made as a result of the lattice 200a including candidate transcription paths that include a class-name identifier, thus indicating a likelihood of a class-based term in the utterance. In some implementations, the lattice expansion pass 124 may be performed only when particular class-name identifiers occur in the lattice 200a that correspond to classes designated as classes for which user-specific and/or utterance-specific terms are likely to be relevant.

As a result of the lattice expansion pass 124, the speech recognizer outputs an augmented lattice 200b. The augmented lattice 200b includes an expanded list 206 of class-based terms for the $names class. The expanded list 206 (depicted in FIG. 2B) includes both names that were originally identified from the first pass result by the static class-based language model (e.g., Barbary, Clark, Lars, and Mark), but also includes new names (e.g., Klark, Frederick, and Marko) that are associated with the user 102 and/or the utterance being transcribed. In some implementations, some or all of the originally identified terms from the first pass may be removed from the list 206 in the augmented lattice 200b, and replaced by new class-based terms associated with the user 102 and/or the utterance. Once the expanded list 206 of class-based terms is determined, the speech recognizer (e.g., decoder 120) may re-score the lattice 200b to determine new probabilities for all or some of the edges 204 in the lattice 200b. The new set of probabilities may be determined in part based on how closely the corresponding term at each edge of the lattice 200b phonetically matches the audio for a corresponding portion of the utterance (e.g., acoustic re-scoring). In some implementations, each of the class-based terms in the expanded list(s) in the lattice 200b can be evaluated against the audio signal to determine how closely each term matches what was spoken in the utterance. In the example depicted in FIG. 2B, the expanded list 206 of class-based terms (names) are derived from a user's contact list. A context server 106 may maintain a copy of the contact list or may request the contact list from the user's device 104. The speech recognizer can then add all or a portion of the names in the contact list to the initial list of class-based terms to form the expanded list 206. In some implementations, class-based terms for other classes may be determined in other ways. For example, restaurants near the location of the user's device 104 may be determined by obtaining a current location indicator for the device 104 and performing a local web search for restaurants within a given distance of the device 104.

The augmented lattice 200b has been described as being a modification of the initial lattice 200a generated by the static class-based language model in a first pass decoding. However, in some implementations, a second lattice, which incorporates user-specific or utterance-specific class-based terms, may be generated from scratch independently of the initial lattice 200a. The new lattice may be created by a dynamically generated, custom class-based language model. In such implementations, the initial lattice 200a may be used to determine whether to generate a lattice with customized class-based terms, although the second lattice may not be derived from the initial lattice 200a.

Figure 3:
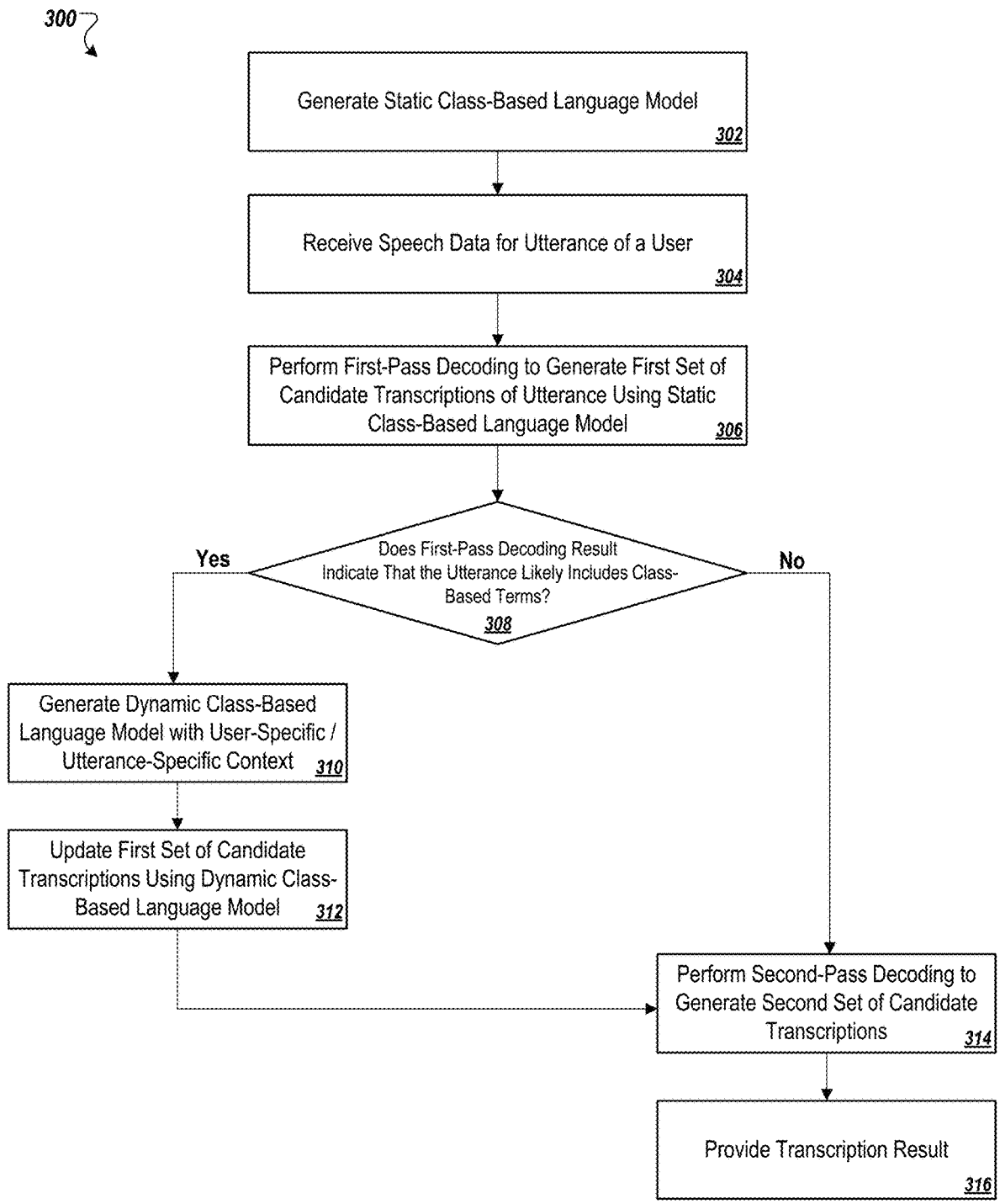
FIG. 3 depicts a flowchart of an example process for transcribing an utterance while deferring custom class-based decoding until the results of an initial static class-based decoding indicate that the custom class-based decoding would facilitate determination of an accurate transcription of the utterance.

FIG. 3 depicts a flowchart of an example process 300 for transcribing an utterance while deferring custom class-based decoding until the results of an initial static class-based decoding indicate that the custom class-based decoding would facilitate determination of an accurate transcription of the utterance. In some implementations, the process 300 may be performed by the devices and systems described herein, such as the computing system 100 (FIG. 1).

At stage 302, the computing system generates a static class-based language model 302. The static class-based language model may be generated independent of any utterance that is to be transcribed or of any speaker who made the utterance. In some implementations, the static class-based language model is an n-gram language model configured to determine candidate transcriptions of an utterance based at least in part on the relative likelihoods that particular sequences of terms occur in a language.

At stage 304, the computing system receives speech data for an utterance of a user. The speech data can be received in some implementations as part of a request to generate a textual transcription of the utterance. In some implementations, the speech data may be pre-processed to condition it for further processing by a language model. For example, when an audio signal for an utterance is first received at a speech recognizer, the audio signal may be processed by an acoustic model to determine possible phonemes or other constituent linguistic units of the utterance. The output of the acoustic model can then be processed by a language model to determine a full transcription.

At stage 306, the computing system performs a first pass-decoding of the speech data to determine one or more candidate transcriptions of the utterance. Rather than initially decoding the utterance with a custom, dynamically generated language model, the system can perform the first pass-decoding using the static class-based language model. In some implementations, using the static model in the first pass decoding can eliminate latency that would otherwise result from generating a custom class-based language model based on context associated with the utterance or the speaker of the utterance before a first-pass decoding could occur. In some implementations, an initial word lattice is generated as a result of the first pass decoding. Other forms of candidate transcriptions may also be determined by the static class-based language model, such as strings of text that each represents a candidate transcription of the utterance.

The computing system can then analyze the result of the first pass decoding to determine whether to incorporate user-specific or utterance-specific class-based terms in the decoding process. In some implementations, the computing system will consider such custom class-based terms if the result of the first pass decoding indicates that the utterance likely includes class-based terms (e.g., if the candidate transcriptions include at least one class identifier) (stage 308).

If the first pass decoding result indicates that the utterance likely does not include class-based terms, then the process 300 proceeds to stage 314 where optionally one or more additional decoding passes can be performed. The subsequent decoding passes may be performed again by the static class-based language model, or may be performed by another more specialized language model. Generally, additional decoding passes may be performed to further refine the transcription of an utterance. In some implementations, the subsequent decoding passes are constrained by the first pass decoding result so that, for example, a new lattice need not be generated after each pass. In some implementations, the process 300 may not perform additional decoding passes, but instead proceeds from stage 308 to stage 316.

At stage 316, the computing system provides one or more transcription results 316 for the utterance. The transcription results can generally be in the form of text that expresses the words determined to have been spoken in the utterance. In some implementations, the transcription result that is determined to most accurately express the words spoken in the utterance is selected as the final transcription result. The selected result(s) may then be stored, presented to a user, transmitted to a remote computing device for presentation to a user or for further processing, or a combination of such actions may be performed with the result(s).

Referring back to stage 308, if the first pass decoding result indicates that the utterance likely does include class-based terms, then the process 300 proceeds from stage 308 to stage 310. At stage 310, the computing system generates a dynamic class-based language model that reflects a context associated with the utterance, the user who spoke the utterance, or both. The dynamic class-based language model includes one or more classes that are populated at least in part by class-based terms derived from the context associated with the utterance, the user, or both. At stage 312, the process 300 may then update the first set of candidate transcriptions (e.g., that were generated at stage 306) using the dynamic class-based language model. The result of operations performed by the dynamic class-based language model can be a second set of candidate transcriptions for the utterance (e.g., individual strings of text or a word lattice). The second set of candidate transcriptions may include user-specific or utterance-specific class based terms that are determined to have likely occurred in the utterance based on analysis of the audio signal for the utterance and the context associated with the utterance and/or the user.

Upon generating the second (updated) set of candidate transcriptions, the process 300 may proceed to stage 314, where the computing system performs one or more additional decoding passes to iteratively refine the set of candidate transcriptions. At stage 316, the computing system provides one or more transcription results 316 for the utterance. In some implementations, for more efficient decoding, the computing system may be configured to proceed directly from stage 312 to stage 316, without performing additional decoding passes to further refine the set of candidate transcriptions. The transcription results can generally be in the form of text that expresses the words determined to have been spoken in the utterance. In some implementations, the transcription result that is determined to most accurately express the words spoken in the utterance is selected as the final transcription result. The selected result(s) may then be stored, presented to a user, transmitted to a remote computing device for presentation to a user or for further processing, or a combination of such actions may be performed with the result(s).

Figure 4:
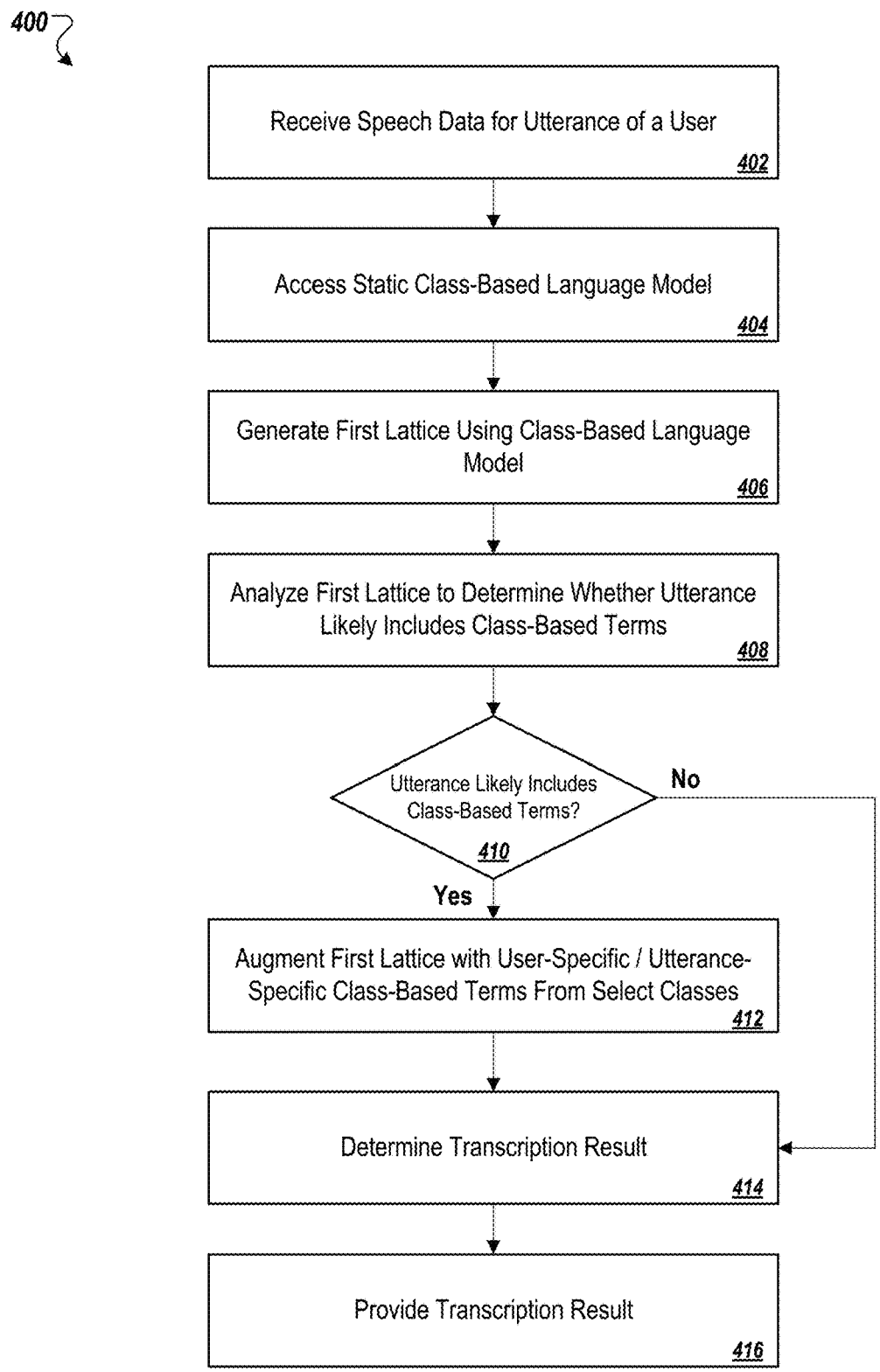
FIG. 4 depicts a flowchart of another example process for transcribing an utterance while deferring use of dynamically generated models until their need for transcribing a given utterance is verified.

FIG. 4 depicts a flowchart of another example process 400 for transcribing an utterance while deferring use of dynamically generated models until their need for transcribing a given utterance is verified. The process 400 is generally similar to the process 300, but more specifically discusses implementations in which the class-based language models produce candidate transcriptions in the form of word lattices like those described with respect to FIGS. 2A and 2B. In some implementations, the process 400 can be performed by the systems and devices discussed herein, such as the system 100 of FIG. 1.

At stage 402, a computing system receives speech data for an utterance of a user. The speech data may be provided to a speech recognizer for pre-processing, for example, by an acoustic model. The result of the pre-processing may then be provided to a decoder for processing by one or more language models. At stage 404, the computing system accesses a static class-based language model, which may have been generated before receipt of the speech data for the utterance and which may be independent of the utterance or the user who spoke the utterance. The static class-based language model can then be used to generate a first word lattice that indicates the probabilities of sequences of terms as candidate transcriptions of the utterance. If the utterance included class-based terms, then the first lattice may include class identifiers or class-based terms referenced by the class identifiers that represent hypotheses for the class-based terms that actually occur in the utterance. At stage 408, the computing system analyzes the first lattice to determine whether the first lattice includes such class identifiers or class-based terms. If, at stage 410, the analysis of the first lattice indicates that the utterance likely includes class-based terms, the process 400 then proceeds to stage 412, where a lattice expansion pass can be performed. During the lattice expansion pass, the first lattice may be augmented with user-specific and/or utterance-specific class based terms for all or some of the classes that were determined based on the first lattice to occur in the utterance. For example, terms that relate to a context of the user or the utterance may be obtained by the speech recognition recognizer and added to the first lattice. The augmented lattice may then be re-scored to determine the relative likelihoods that the various permutations of terms specified by the augmented lattice were spoken in the utterance. At stage 414, one or more transcription results are determined from the augmented lattice, such as by determining a path through the lattice that indicates the most likely sequence of terms spoken in the utterance. At stage 416, the transcription results can be provided for storage, display, transmission over a network, or for further processing, for example.

Figure 5A:
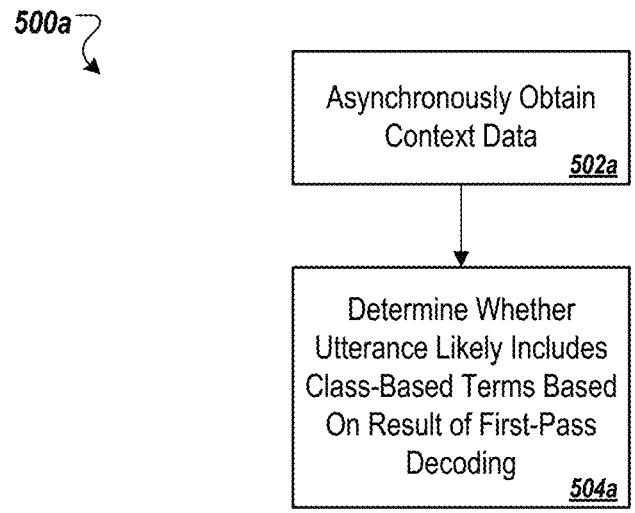
FIGS. 5A and 5B are flowcharts of example processes for obtaining context data related to a user or an utterance for use in generating dynamic models.
Figure 5B:
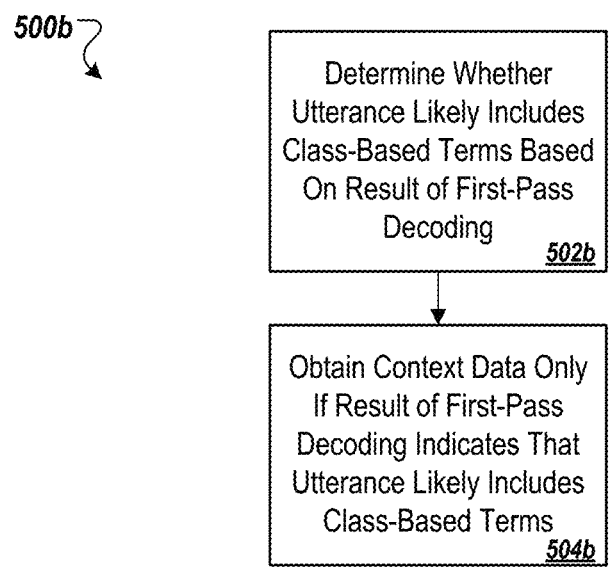

Turning to FIGS. 5A and 5B, respective flowcharts are shown that depict alternative processes 500*a*, 500*b* for obtaining context data related to a user or an utterance for use in generating dynamic class models and/or a dynamic class-based language model customized to a given user or utterance. The alternatives generally relate to the timing of when the context data is obtained (and optionally when the dynamic class models and/or dynamic class-based language models are generated as well). In the process of 500*a* (FIG. 5A), the context data is obtained, or at least a subroutine for obtaining the context data is initiated, before a determination is made as to whether the utterance likely includes class-based terms based on a result of the first-pass decoding. For example, immediately upon receiving speech data for an utterance that is to be transcribed, a speech recognition system may request (e.g., by a remote procedure call (RPC)) context data from a context server for context related to the utterance or the speaker of the utterance. The context data may thus be available to the speech recognition system regardless of whether the data is actually used to augment an initial lattice with user-specific or utterance-specific class-based terms or used by a dynamic class-based language model to transcribe the utterance. Thus, if a result of the first pass decoding using a static class-based language model indicates that the utterance likely does not include class-based terms (or otherwise indicates that custom class-based models are not necessary to transcribe the utterance), the obtained context data may be disregarded by the speech system. On the other hand, if a result of the first pass decoding indicates that the utterance likely does implicate class-based terms, the context data may then be applied to expand a lattice with appropriate class-based terms that may be indicated by a dynamic class-based language model built in part using the context data. In some implementations, the context data according to the process 500*a* is obtained asynchronously and while the speech system is concurrently performing the first pass decoding of an utterance. One benefit of the approach depicted in FIG. 5A is that, in some implementations, the overall latency of generating a transcription is reduced when a lattice expansion pass or other passes using models dynamically generated using the context data are performed. For example, the context data can be immediately available to perform the lattice expansion pass by the time the lattice expansion pass is ready to be performed. In some implementations, the dynamic class models, the dynamic class-based language model, or both may be generated concurrently with the first pass decoding so as to further minimize the overall latency associated with lattice expansion and other passes using dynamically generated models.

The sequence of operations in process 500*b* (FIG. 5B) is generally arranged to reduce the computational expense of obtaining context data and generating dynamic models in instances where dynamic models are not needed to transcribe the utterance. For example, rather than asynchronously obtaining context data and generating dynamic models in parallel with the first-pass decoding of an utterance, FIG. 5B shows that the speech system may first determine whether the utterance likely includes class-based on a result of the first pass-decoding (stage 502*b*). Only if the result of the first-pass decoding indicates that the utterance likely includes class-based terms does the process 500*b* proceed to stage 504*b* to obtain the context data and generate dynamic class models and a dynamic class-based language model. As such, for utterances processed by the speech recognizer that do not call for custom class-based terms or that do not include class-based terms at all, the latency and computational expense associated with generating dynamic models can be reduced or eliminated entirely. This approach may be beneficial, for example, if the speech recognizer is expected to handle a significant volume of transcriptions that do not include class-based terms.

Figure 6:
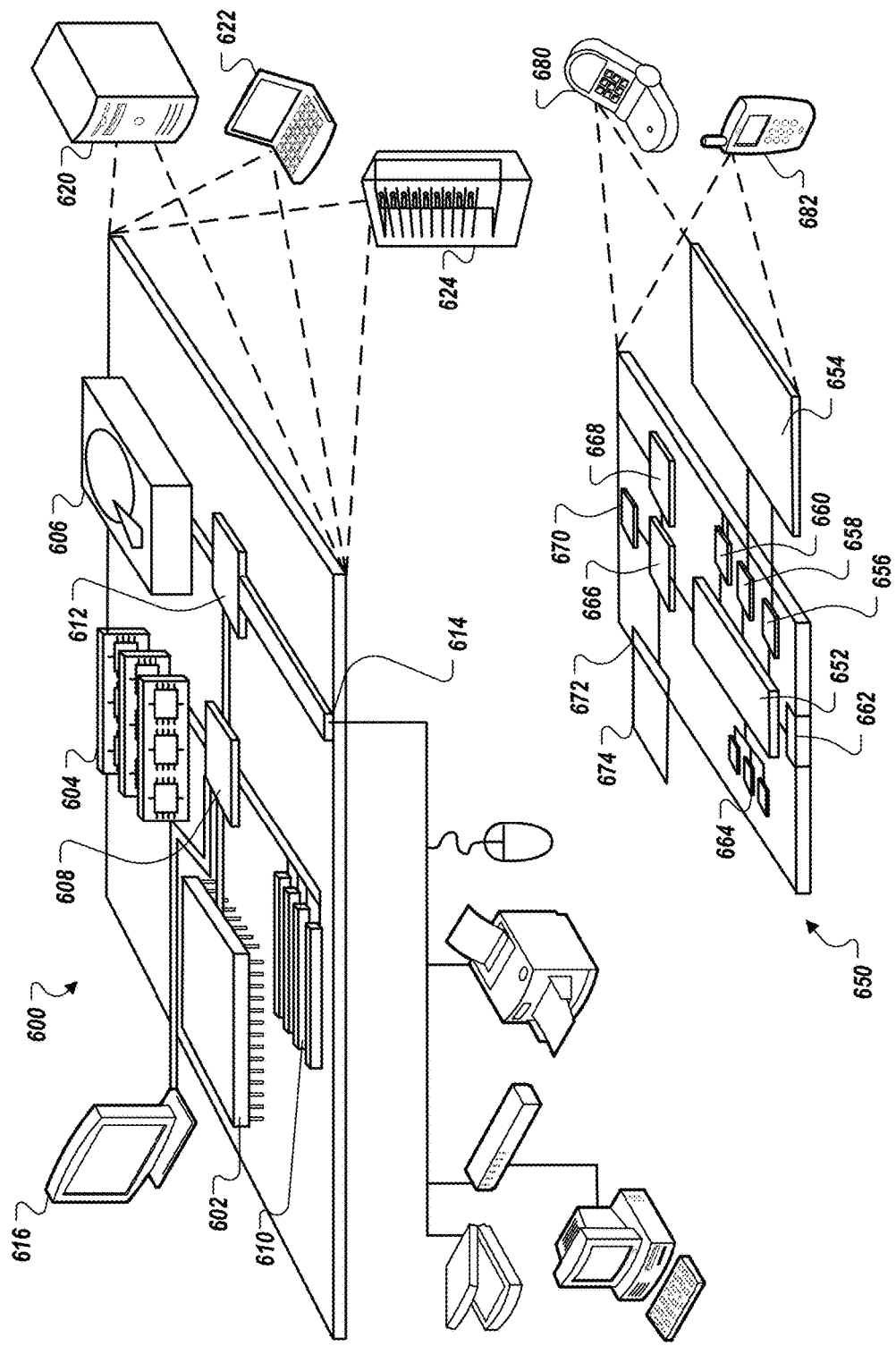
FIG. 6 shows an example of a computing device 600 and a mobile computing device that can be used to implement the techniques described herein.

FIG. 6 shows an example of a computing device 600 and a mobile computing device that can be used to implement the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method when executed on data processing hardware causes the data processing hardware to perform operations comprising:
   receiving an audio signal characterizing an utterance spoken by a user and captured by a computing device associated with the user;
   generating, using a class-based language model, a word lattice representing a transcription hypothesis path that traverses a sequence of candidate terms corresponding to a respective transcription for the utterance, the sequence of candidate terms including a class identifier;
   generating, based on profile data associated with the user that spoke the utterance, a list of additional candidate terms for the class identifier in the sequence of candidate terms, each additional candidate term in the list of additional candidate terms comprising a user-specific class-based term derived from the profile data associated with the user that spoke the utterance and belonging to a class associated with the class identifier included in the sequence of candidate terms;
   expanding the word lattice to include the list of additional candidate terms for the class identifier in the sequence of candidate terms; and providing, using the expanded word lattice, a speech recognition result for the utterance.

2. The computer-implemented method of claim 1, wherein the user-specific class-based term comprises a name derived from a contact list of the profile data associated with the user.

3. The computer-implemented method of claim 1, wherein the word lattice is represented by a finite state transducer.

4. The computer-implemented method of claim 1, wherein the class-based language model comprises an n-gram language model.

5. The computer-implemented method of claim 4, wherein the class-based language model assigns each candidate term in the sequence of candidate terms in the word lattice a respective probability based on a statistical likelihood that the candidate term would follow an immediately preceding n−1 candidate terms.

6. The computer-implemented method of claim 1, wherein the data processing hardware resides on the computing device.

7. The computer-implemented method of claim 1, wherein the operations further comprise, prior to generating the word lattice, processing, using an acoustic model, the audio signal to generate a set of candidate phonemes or linguistic units of the utterance.

8. The computer-implemented method of claim 1, wherein the operations further comprise asynchronously obtaining the profile data associated with the user in parallel with generating the word lattice.

9. The computer-implemented method of claim 1, wherein the operations further comprise:
  determining the sequence of candidate terms in the word lattice includes the class identifier; and
  in response to determining the sequence of candidate terms in the word lattice includes the class identifier, obtaining the profile data associated with the user.

10. The computer-implemented method of claim 1, wherein the class identifier flanks a pre-defined class-based candidate term that occurs in the word lattice.

11. A system comprising:
  data processing hardware; and
  memory hardware in communication with the data processing hardware and storing instructions that when executed on the data processing hardware cause the data processing hardware to perform operations comprising:
    receiving an audio signal characterizing an utterance spoken by a user and captured by a computing device associated with the user;
    generating, using a class-based language model, a word lattice representing a transcription hypothesis path that traverses a sequence of candidate terms corresponding to a respective transcription for the utterance, the sequence of candidate terms including a class identifier;
    generating, based on profile data associated with the user that spoke the utterance, a list of additional candidate terms for the class identifier in the sequence of candidate terms, each additional candidate term in the list of additional candidate terms comprising a user-specific class-based term derived from the profile data associated with the user that spoke the utterance and belonging to a class associated with the class identifier included in the sequence of candidate terms;
    expanding the word lattice to include the list of additional candidate terms for the class identifier in the sequence of candidate terms; and
    providing, using the expanded word lattice, a speech recognition result for the utterance.

12. The system of claim 11, wherein the user-specific class-based term comprises a name derived from a contact list of the profile data associated with the user.

13. The system of claim 11, wherein the word lattice is represented by a finite state transducer.

14. The system of claim 11, wherein the class-based language model comprises an n-gram language model.

15. The system of claim 14, wherein the class-based language model assigns each candidate term in the sequence of candidate terms in the word lattice a respective probability based on a statistical likelihood that the candidate term would follow an immediately preceding n−1 candidate terms.

16. The system of claim 11, wherein the data processing hardware resides on the computing device.

17. The system of claim 11, wherein the operations further comprise, prior to generating the word lattice, processing, using an acoustic model, the audio signal to generate a set of candidate phonemes or linguistic units of the utterance.

18. The system of claim 11, wherein the operations further comprise asynchronously obtaining the profile data associated with the user in parallel with generating the word lattice.

19. The system of claim 11, wherein the operations further comprise:
  determining the sequence of candidate terms in the word lattice includes the class identifier; and
  in response to determining the sequence of candidate terms in the word lattice includes the class identifier, obtaining the profile data associated with the user.

20. The system of claim 11, wherein the class identifier flanks a pre-defined class-based candidate term that occurs in the word lattice.

* * * * *